United States Patent
Kim (12)

(10) Patent No.: US 6,222,696 B1
(45) Date of Patent: Apr. 24, 2001

(54) HEAD UNLATCH CONTROLLING METHOD AND ARRANGEMENT IN MAGNETIC DISK DRIVE

(75) Inventor: Gwan-Il Kim, Taegukwangyok-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/116,484

(22) Filed: Jul. 16, 1998

(30) Foreign Application Priority Data

Jul. 18, 1997 (KR) .................................... 97-33492

(51) Int. Cl.$^7$ .................................................... G11B 21/02
(52) U.S. Cl. ........................ 360/75; 360/78.07; 360/256.3
(58) Field of Search .................................... 360/75, 78.06, 360/78.07, 250, 254, 77.02, 78.04, 256.3, 256.2

(56) References Cited

U.S. PATENT DOCUMENTS

| 4,864,437 | * | 9/1989 | Couse et al. ........................... 360/75 |
| 5,144,504 | | 9/1992 | Kitazawa . |
| 5,235,476 | | 8/1993 | Mikada et al. . |
| 5,241,435 | | 8/1993 | Satio et al. . |
| 5,315,455 | | 5/1994 | Ito . |
| 5,383,068 | | 1/1995 | Shimizu et al. . |
| 5,392,174 | | 2/1995 | Suzuki . |
| 5,434,725 | | 7/1995 | Hirose et al. . |
| 5,485,323 | | 1/1996 | Anderson et al. . |
| 5,561,568 | | 10/1996 | Kisaka . |
| 5,608,588 | | 3/1997 | Kisaka . |
| 5,659,438 | | 8/1997 | Sasamoto et al. . |
| 5,739,971 | | 4/1998 | Yamaki et al. . |
| 5,754,357 | | 5/1998 | Anderson et al. . |
| 5,781,363 | * | 7/1998 | Rowan et al. ..................... 360/78.09 |

FOREIGN PATENT DOCUMENTS

| 2 321 760 | 8/1998 | (GB) . |
| 59-152562 | 8/1984 | (JP) . |
| 6-52644 | 2/1994 | (JP) . |

* cited by examiner

Primary Examiner—Alan T. Faber
(74) Attorney, Agent, or Firm—Robert E. Bushnell, Esq.

(57) ABSTRACT

In a head unlatch controlling method and arrangement in a hard disk drive head unlatch controlling method, a head unlatch operation is performed in an open loop mode, using a predetermined current profile. A determination is made as to whether servo information is accurately detected during the head unlatch operation in the open loop mode. If the servo information is accurately detected, the head unlatch operation is shifted from the open loop mode to a closed loop mode on the basis of the servo information. If the servo information is not accurately detected, the head unlatch operation continues in the open loop mode.

15 Claims, 6 Drawing Sheets

HEAD UNLATCH CONTROLLING METHOD AND ARRANGEMENT IN MAGNETIC DISK DRIVE

This application makes reference to, incorporates the same herein, and claims all benefits accruing under 35 U.S.C. §119 from an application for HEAD UNLATCH CONTROLLING METHOD IN MAGNETIC DISK DRIVE earlier filed in the Korean Industrial Property Office on the 18$^{th}$ of May 1997 and there duly assigned Serial No. 33492/1997.

BACKGROUND OF THE INVENTION

1. Technical Field

The present invention relates to a magnetic disk drive and, in particular, to a head unlatch controlling method and arrangement in a hard disk drive employing a magnetic latch mechanism.

2. Related Art

A hard disk drive, widely used as an auxiliary memory device for a computer system, is largely divided into two parts: a printed circuit board assembly (PCBA) including most circuit components installed on a printed circuit board (PCB); and a head disk assembly (HDA) including most mechanical components, such as a head and a magnetic disk, and several circuit components.

As explained in more detail below, the typical control of a hard disk drive involves the use of a head unlatch controlling method. Such a method results in movement of the heads of the hard disk drive, which were previously parked in parking zones of the disks of the hard disk drive, to data areas of the disks. However, problems are experienced with such head unlatch controlling methods. In particular, a servo address mark (SAM) located in the servo sector of the disk is not accurately detected when the heads move from the parking zones. Furthermore, a read/write channel circuit typically employed in controlling the hard disk drive is not sufficiently stabilized, and this makes it impossible to accurately obtain position information relative to the heads. Accordingly, head unlatch is controlled by predetermined current and time values, and this is referred to as an "open loop" mode of operation.

The latter controlling method may be reliable under conditions of uniform and invariable performance of the parts of the hard disk drive, but problems arise when designs of the parts are frequently modified and when the modified parts exhibit non-uniform performance. In such cases, the hard disk drive may not be controlled by use of the predetermined current and time values typically employed in the open loop mode of operation.

The following patents are considered to be representative of the prior art relative to the invention, but are burdened by the disadvantages set forth herein: U.S. Pat. No. 5,144,504 to Kitazawa, entitled Method Of Controlling Positioning Of Magnetic Head Of Disk Drive Unit And Disk Drive Unit Executing Same, U.S. Pat. No. 5,241,435 to Saito et al., entitled Servo Information Recording Method For A Storage Apparatus, U.S. Pat. No. 5,383,068 to Shimizu et al., entitled Head Position Recognition Method, A Speed Calculation Method, And A Head Movement Speed Control Device, U.S. Pat. No. 5,392,174 to Suzuki, entitled Method And Apparatus For Controlling The Speed Of Movement Of The Head Of A Disk Drive Apparatus To A Target Track, U.S. Pat. No. 5,434,725 to Hirose et al., entitled Magnetic Disk Driving Device For Controlling The Position Of A Magnetic Head Relative To The Disk, U.S. Pat. No. 5,561,568 to Kisaka, entitled Method And Apparatus For Fast Positioning A Head Of A Recording Device, U.S. Pat. No. 5,608,588 to Kisaka, entitled Method For Controlling Digital Closed Servo Loop System And Disk Storage Apparatus Using The System, U.S. Pat. No. 5,659,438 to Sasamoto et al., entitled Head Positioning Control System Using Stored Voice Coil Motor Correction Data, U.S. Pat. No. 5,739,971 to Yamaki et al., entitled Head-Position Controlling Device, U.S. Pat. No. 5,754,357 to Anderson et al., entitled Method And Apparatus For Moving A Disk Drive Actuator Away From A Magnetic Latch, Japanese Patent No. 59-152562 to Nehira, entitled Magnetic Disk Memory, and Japanese Patent No. 6-52644 to Enozono, entitled Magnetic Disk Device.

The above patents disclose various methods and arrangements for controlling a magnetic disk drive. For example, Anderson et al. '357 discloses a magnetic disk drive control method and arrangement which moves an actuator away from a magnetic latch. Control of the position of the head of a magnetic disk drive is also disclosed (for example,see, Yamaki et al. '971). Kisaka '588 discloses a disk storage apparatus which employs a digital closed servo loop system and a method for controlling that system. Other patents (for example, Suzuki '174) disclose methods and apparatus for controlling the speed of movement of the head of a disk drive.

As mentioned above, each of the above patents is burdened by the disadvantages set forth herein. Moreover, none of the patents discloses or suggests a method and arrangement for controlled head unlatching wherein both an open loop and a closed loop mode of operation are employed, nor do the patents mentioned above disclose changing from the open loop mode of operation to the closed loop mode of operation based on a determination as to whether servo information is accurately detected during performance of an open loop mode of operation.

SUMMARY OF THE INVENTION

To overcome the above problems, an object of the present invention is to provide a head unlatch controlling method and arrangement which can be implemented in a manner compatible with variations of part performances or design modifications.

Another object of the present invention is to provide a head unlatch controlling method and arrangement which can reduce failure rate in the manufacturing process.

To achieve the above objects, the head unlatch controlling method and arrangement in a hard disk drive employs a magnetic latch mechanism, and head unlatch is performed in an open loop using a predetermined current profile. A determination is made whether servo information is accurately detected during head unlatch in the open loop. Then, if the servo information is accurately detected, the head unlatch is shifted from the open loop to a closed loop on the basis of the servo information. if the servo information is not accurately detected, head unlatch continues in the open loop.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
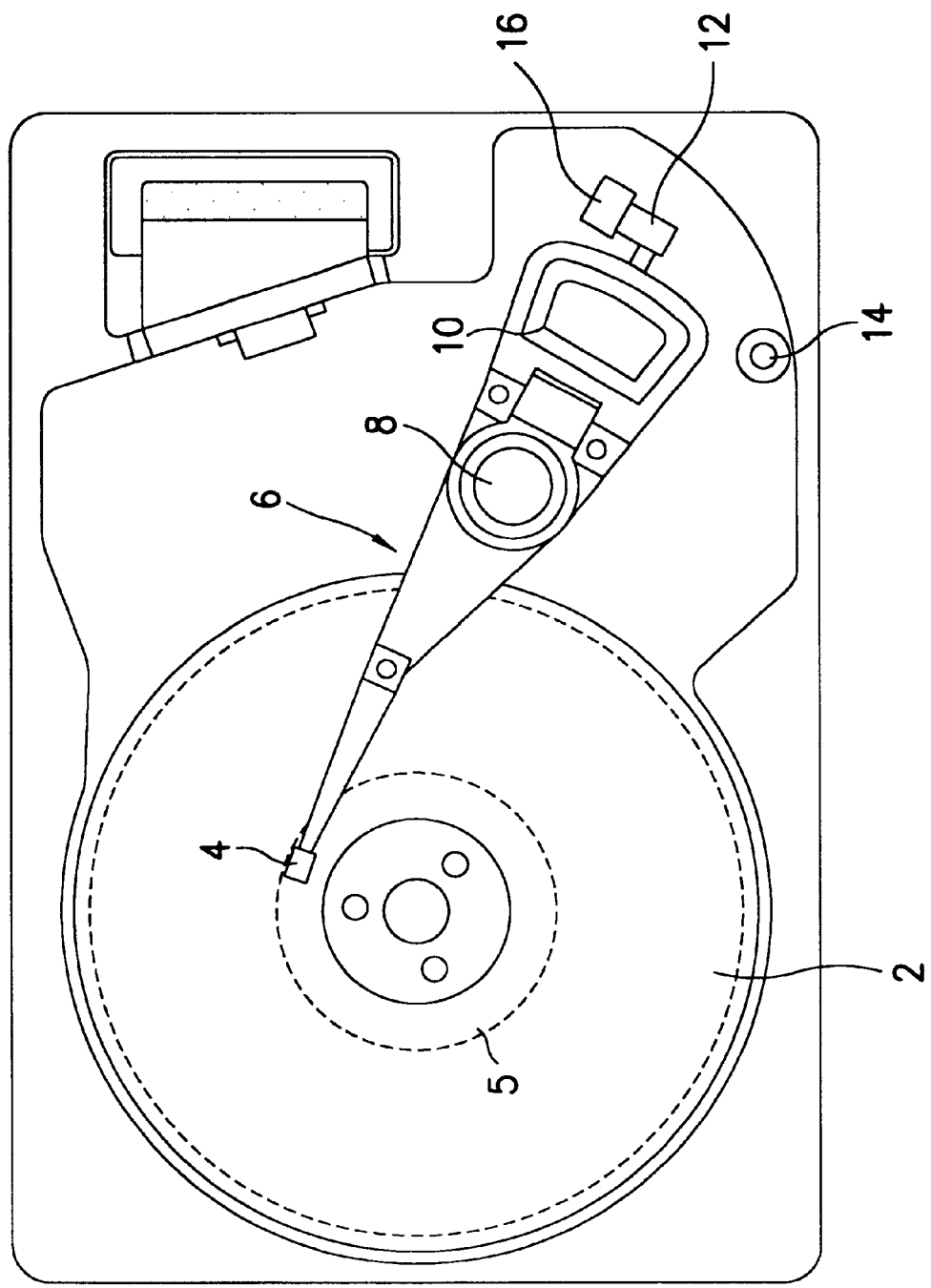
FIG. 1 is a schematic view of a head/disk assembly (HDA) employing a magnetic latch mechanism.

FIG. 1 is a schematic view of an exemplary HDA employing a magnetic latch mechanism. Referring to FIG. 1, data transmitted from a host computer is magnetically recorded on a disk 2 rotated at a constant speed by a spindle motor (not shown in FIG. 1). A head 4 fixed at one end of an actuator 6 records data on or reads data from the rotating disk 2, while moving over the disk 2 at a predetermined height. The actuator 6 has a steel piece 12, which is readily drawn to a magnet, at the other end thereof, and is supported by a pivot bearing 8. A coil 10 of a voice coil motor (not shown) is disposed between the pivot bearing 8 and the steel piece 12 on the actuator 6. The actuator 6 moves in the radial direction of the disk 2, rotating around the pivot bearing 8 as an axis by driving of the voice coil motor. An outer crash stopper 14 is installed on a base to prevent the head 4 from moving outside the disk 2, and a magnet 16 (i.e., an inner crash stopper) magnetically sticks to the steel piece 12 to thereby fix the actuator 6 when the hard disk drive is not operated. In FIG. 1, the actuator 6 is latched by the magnet 16, with the head 4 parked in a parking zone 5.

Figure 2:
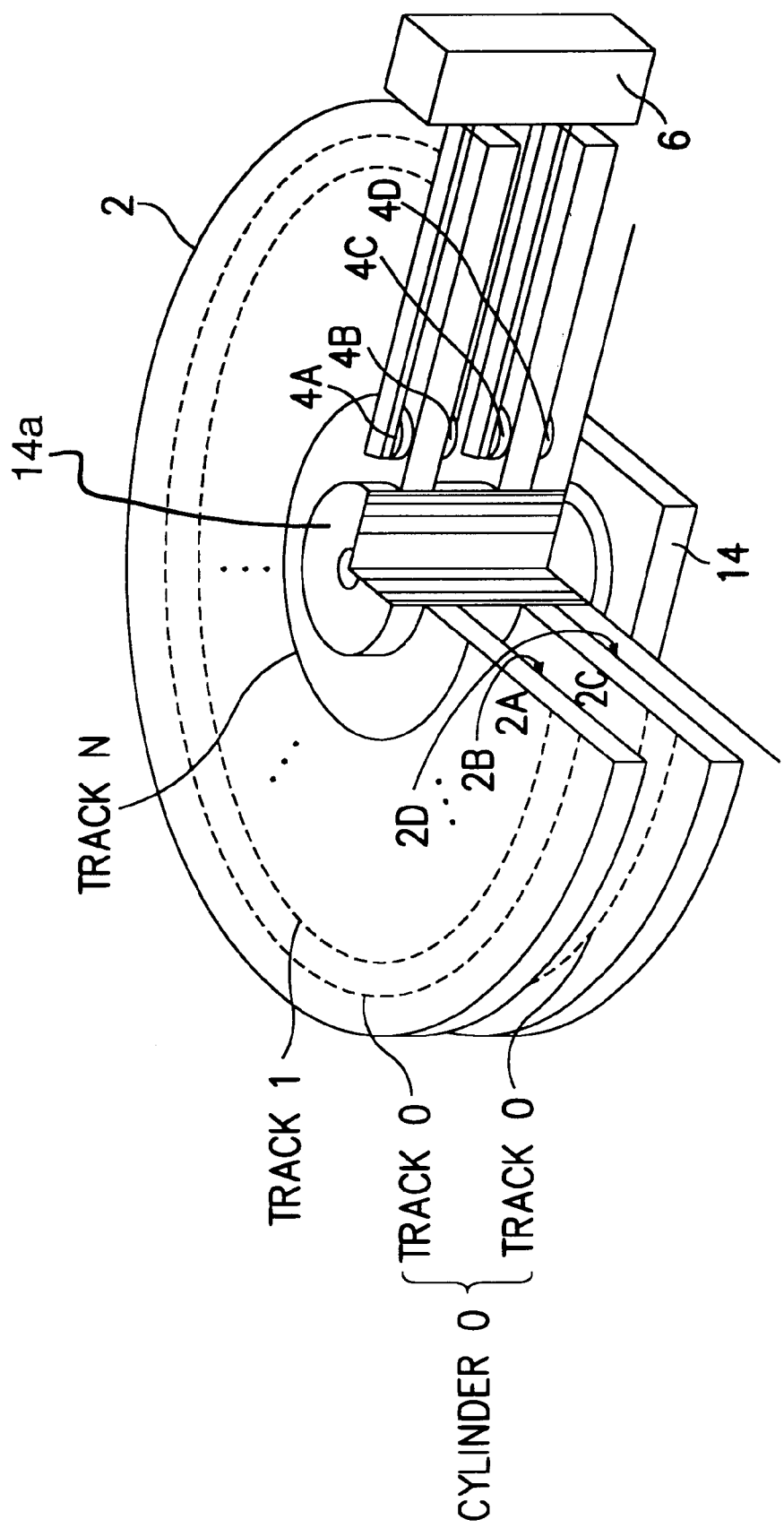
FIG. 2 is a partial sectional view of disks in a multi-platter hard disk drive.

FIG. 2 is a partial sectional view of disks in a multi-platter hard disk drive. The multi-platter disks are used to maximize data storage capacity. Referring to FIG. 2, two disks 2 are stacked around a driving shaft 14a of a spindle motor 14, and heads 4A–4D fixed to arms perpendicularly extended from the actuator 6 are positioned over disk surfaces 2A–2D, respectively. Meanwhile, tracks 0-N are concentrically arranged on each of the disk surfaces 2A–2D. Tracks labeled with the same track number on the disk surfaces 2A–2D corresponding to the heads 4A–4D, respectively, are called a cylinder. The same tracks on the respective disks are denoted by an identical cylinder number. For example, tracks 0 on the disk surfaces 2A–2D are defined as cylinder 0.

In a hard disk drive, a head is selectively positioned over an intended track on a disk in a servo control mode of a servo mechanism. The servo control mode includes two stages: track search and track following called a search mode and a track mode, respectively. By track search, the head is moved from a current track to the intended track, while by track following, once the head has been positioned over the target track, the head accurately follows the center line of the track in order to accurately read and write data.

Figure 3:
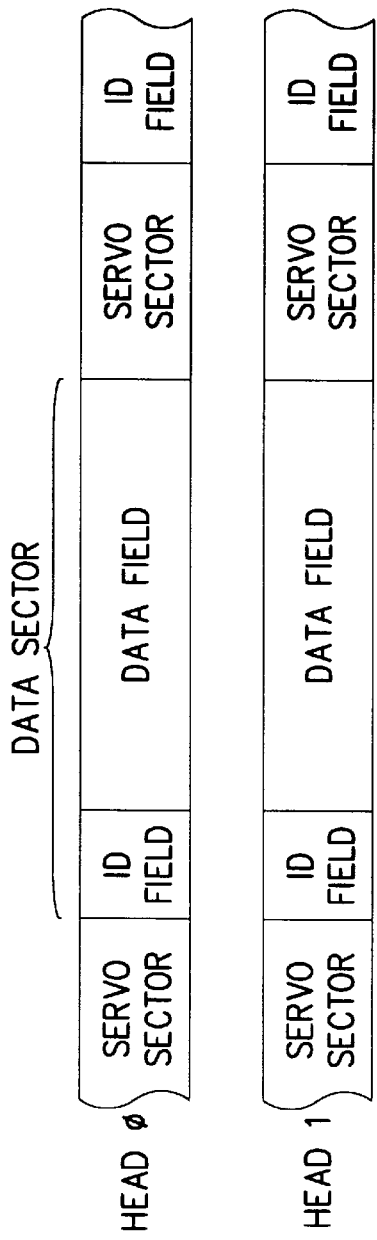
FIG. 3 illustrates a data format for each track on a disk surface in an embedded servo system.
Figure 3:
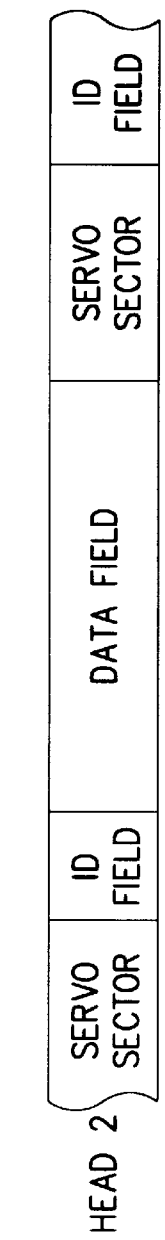
Figure 3:
Figure 4:
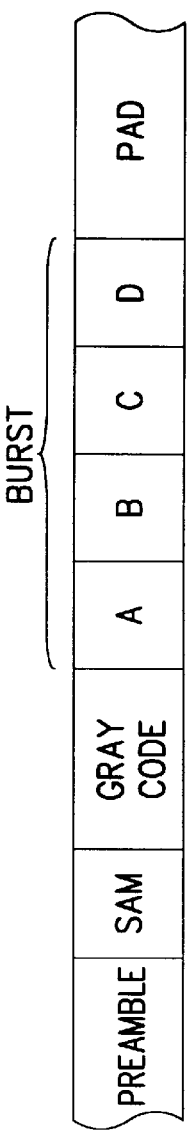
FIG. 4 illustrates a pattern of servo information recorded in the servo sectors shown in FIG. 3.

For such track search and track following, a track on a disk surface has a data format as shown in FIG. 3. FIG. 3 illustrates a data format for each track on the disk surface in an embedded servo system, with servo and data sectors alternating. FIG. 4 illustrates a servo pattern recorded in the servo sectors of FIG. 3.

Referring to FIG. 3, servo sectors and data sectors are alternately arranged in tracks corresponding to heads 0–3. The servo sectors are used for servo control, such as track search and track following, usually occupying 9–11% of the total capacity of a disk, while the data sectors are used for recording user data.

FIG. 3 shows exemplary sector formats for four tracks in the same cylinder of disks corresponding to the respective heads 0–3. A data sector is typically divided into an identification (ID) field and a data field. Header information for identifying a corresponding data sector is recorded in the ID field, and digital data is recorded in the data field. Servo sectors are positioned before and after the data sectors.

Referring to FIG. 4, a servo sector is divided into preamble, servo address mark (SAM), gray code, bursts A, B, C, and D, and PAD. The preamble, (namely, a servo sync) provides clock synchronization during the reading of servo information, and it serves as a gap before a servo sector to indicate the servo sector. The SAM provides synchronization for reading the following gray code by indicating the start of servo. The gray code provides information on each track, (that is, track numbers), and the bursts A, B, C, and D provide a position error signal (PES) required for track search and track following. The PAD provides a transition margin between a servo sector and a data sector.

Figure 5:
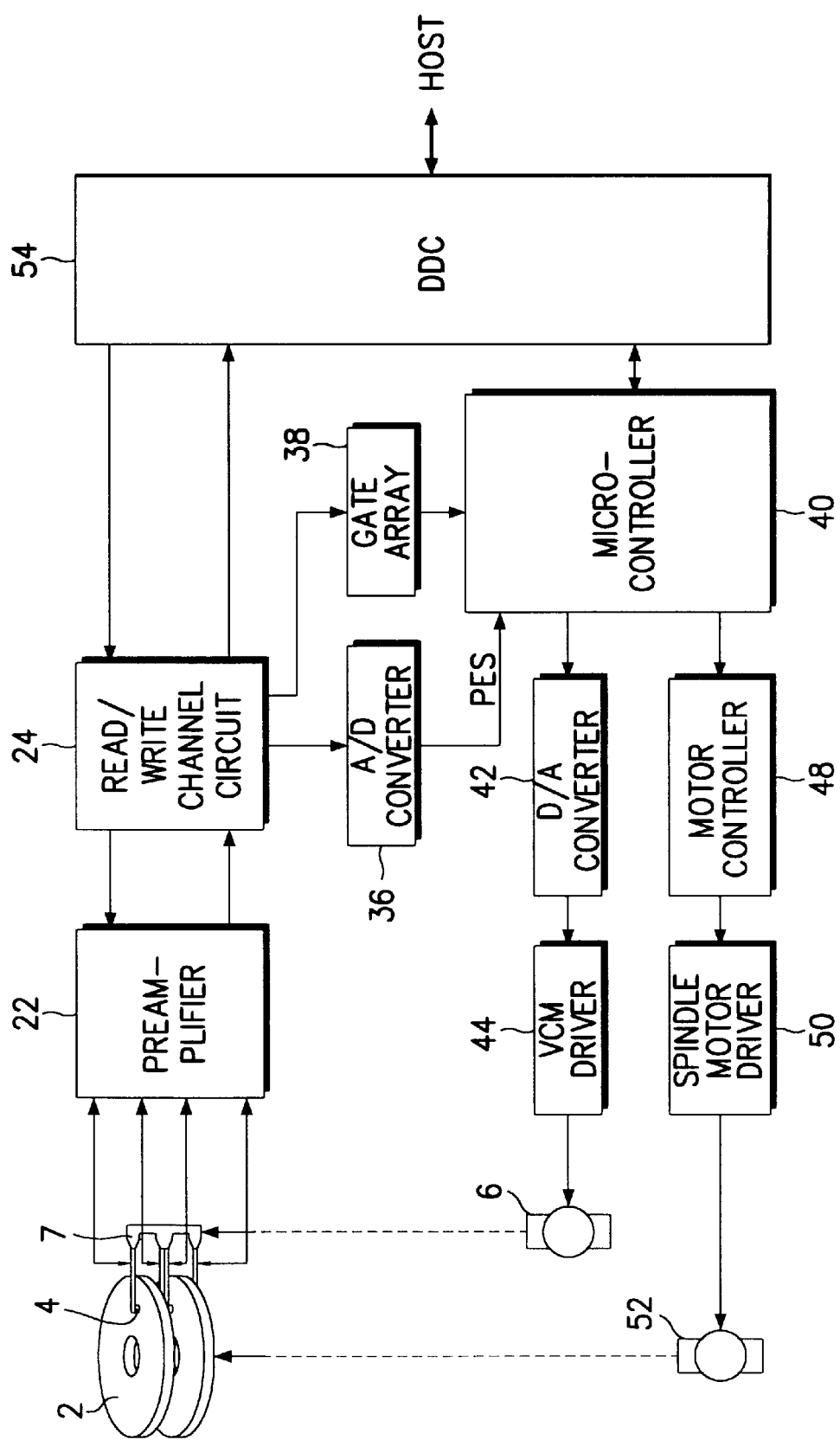
FIG. 5 is a block diagram of the general multi-platter hard disk drive.

FIG. 5 is a block diagram of a general hard disk drive having, for example, two disks 2. The disks 2 are rotated by a spindle motor 52. Heads 4 are positioned over the surfaces of the disks 2, and are installed on a front end of an arm perpendicularly extended from an arm assembly 7 of the actuator 6. A preamplifier 22 preamplifies a signal picked up by a head 4 during a data read, and records encoded write data applied from a read/write channel circuit 24 on a disk 2 by driving the head 4 during a data write. The read/write channel circuit 24 detects data pulses from a read signal provided by the preamplifier 22, decodes the detected data pulses, and applies the decoded signal to a disk data controller (DDC) 54. The read/write channel circuit 24 also encodes write data applied from the DDC 54, and applies the encoded write data to the preamplifier 22. The DDC 54 interfaces communication between a host computer and a microcontroller 40, and between the host computer and the read/write channel circuit 24. The microcontroller 40 controls track search and track following in response to a read or write command received from the host computer. A voice coil motor (VCM) driver 44 receives a servo control value (i.e., a head position control value) via a digital/analog (D/A) converter 42, generates a driving current for driving the actuator 6, and applies the driving current to a VCM of the actuator 6. The actuator 6 moves the heads 4 in the radial direction of the disks 2 according to the direction and value of the driving current provided by the VCM driver 44. A motor controller 48 provides a control value for controlling the rotation of the disks 2 to a spindle motor controller 50 under the control of the microcontroller 40. The spindle motor driver 50 drives the spindle motor 52 according to the control value to thereby rotate the disks 2. An analog/digital (A/D) converter 36 converts a PES to a digital signal by means of a burst signal included in servo information applied via the read/write channel circuit 24, and outputs the digital signal to the microcontroller 40. A gate array 38 generates various timing signals for data read and write operations, decodes the servo information, and applies the timing signals and the decoded servo information to the microcontroller 40.

When this hard disk drive is not operated, the heads 4 are parked on parking zones 5 as shown in FIG. 1. In this state, the steel piece 12 of the actuator 6 sticks to the magnet 16, as described with reference to FIG. 1. The steel piece 12 and the magnet 16 act as a latch, and this is called a latch state. When the hard disk drive is operated from the latch state, the microcontroller 40 of FIG. 5 controls the heads 4 parked on the parking zones 5 shown in FIG. 1 to move out to data areas on the disks 2.

Figure 6:
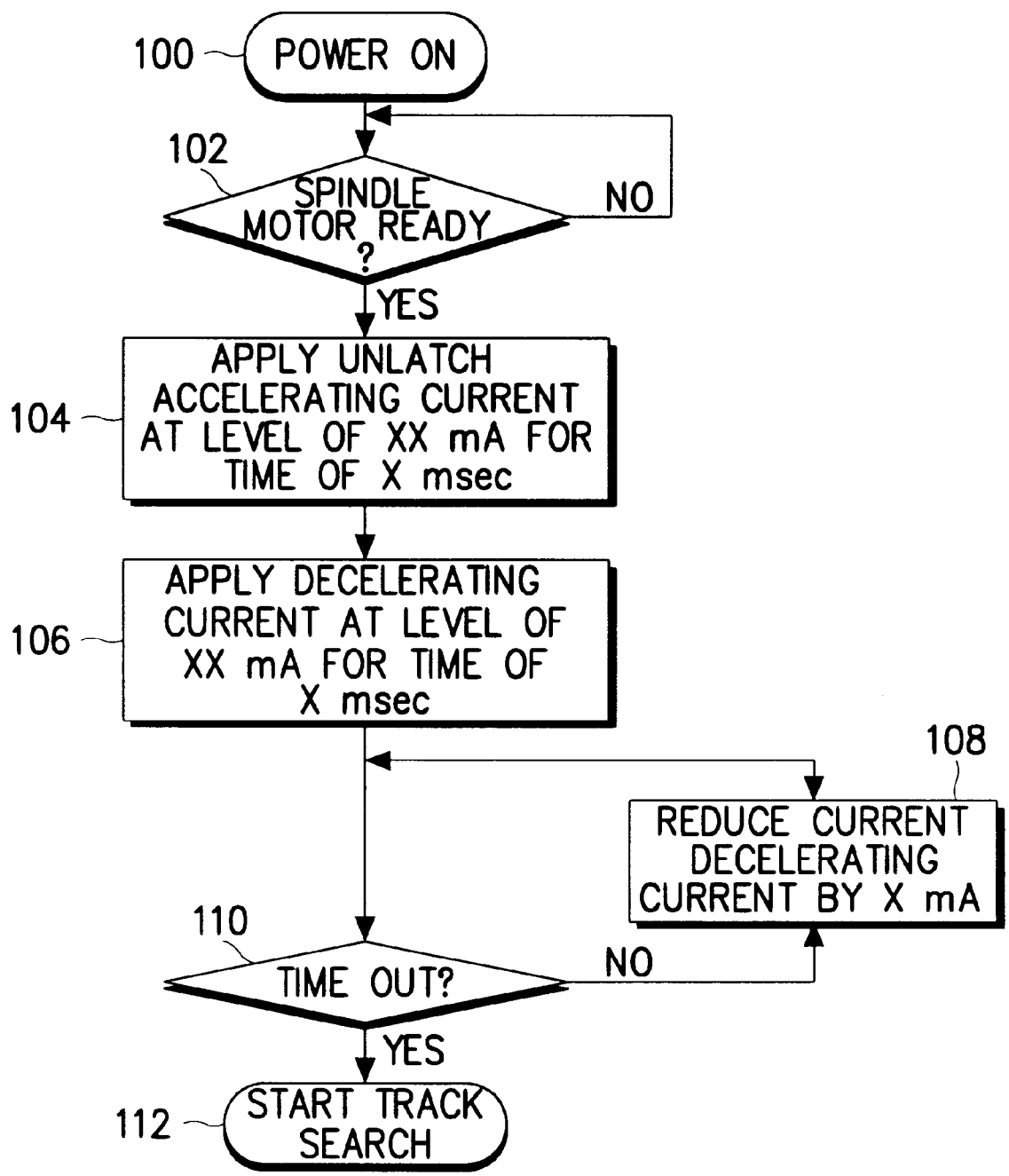
FIG. 6 is a flowchart of a head unlatch controlling method.

FIG. 6 is a flowchart of a conventional head unlatch controlling method.

Referring to FIGS. 1, 5, and 6, when the hard disk drive is turned on at step 100, the spindle motor 52 is made ready under the control of the microcontroller 40. That is, the microcontroller 40 controls the motor controller 48 to rotate the spindle motor 52 at a constant speed. This indicates that the spindle motor 52 is ready. The microcontroller 40 determine whether the spindle motor 52 is ready, at step 102. If it is ready, a head unlatch operation is performed at steps 104–110. At step 104, an unlatch accelerating current having at a predetermined value of XX mA is applied for a predetermined time XX msec. At step 106, a decelerating current having a predetermined value of XX mA is applied for a predetermined time X msec. At step 110, it is determined whether time is out. The timeout takes place after passage of a time sufficient to completely unlatch the heads 4. If time is not out, the decelerating current is reduced by X mA, at step 108, and step 110 is repeated. If time is out at step 110, the microcontroller 40 starts to search a track, at step 112. Under such head unlatch control, the heads 4 parked on the parking zones 5 move to the data areas of the disks 2.

However, in the latter head unlatch controlling method, SAM is not accurately detected when the heads 4 move from the parking zones 5, and the read/write channel circuit 24 is not sufficiently stabilized, thus making it impossible to accurately obtain position information as to the heads 4. Therefore, head unlatch is controlled by predetermined current and time values, that is, by a open loop. Such controlling method may be very reliable under the conditions of uniform and invariable performances of parts. However, if designs of the parts are frequently modified and the modified parts exhibit non-uniform performance, a hard disk drive may not be controlled by the predetermined current and time values.

Figure 7:
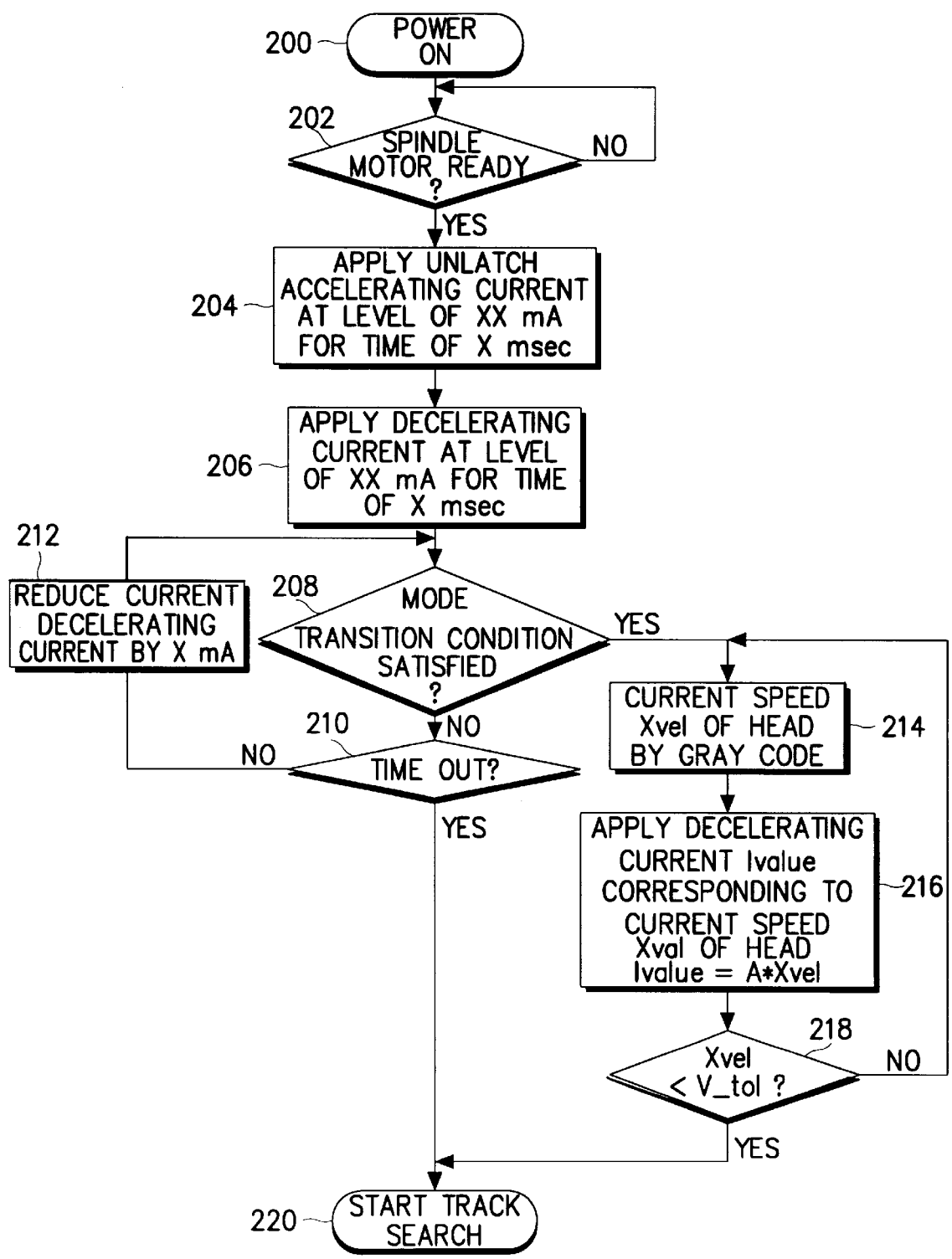
FIG. 7 is a flowchart of a head unlatch controlling method according to an embodiment of the present invention.

Referring to FIG. 7, in a head unlatch controlling method according to the present invention, if servo information is detected while a head unlatch is performed in an open loop, using a predetermined current profile, the head unlatch shifts to a closed loop based on the servo information. The difference between the open and closed loops lies in whether a current speed of the heads 4 is fed-back, or not. That is, the current speed of the heads 4 is fed back in the closed loop, whereas it is not in the open loop.

Referring to FIGS. 1–5, and 7, the head unlatch controlling method according to an embodiment of the present invention will be described in detail.

When power is on at step 200, the spindle motor 52 is made ready under the control of the microcontroller 40. That is, the microcontroller 40 controls the motor controller 48 to rotate the spindle motor 52 at a constant speed. This indicates that the spindle motor 52 is ready. At step 202, the microcontroller 40 determines whether the spindle motor 52 is ready. If it is ready, a head unlatch operation is performed at steps 204–218.

At step 204, the microcontroller 40 applies an unlatch accelerating current having a predetermined value of XX mA to the VCM driver 44 for a predetermined time XX msec via the D/A converter 42. At step 206, the microcontroller 40 applies a decelerating current to the VCM driver 44 at the predetermined value XX mA for a predetermined time X msec. At step 208, the microcontroller 40 determines whether a mode transition condition is satisfied. That is, the microcontroller 40 determines whether SAM information, as shown in FIG. 4, is accurately read by continuously checking an input signal through gate array 38. The SAM information is included in a servo sector of a disk, and is provided as a reference for generating various timing pulses related to servo control. Thus, if the SAM information is accurately read, the microcontroller 40 determines that the mode transition condition is satisfied. If the mode transition condition is not satisfied, the microcontroller 40 determines whether time is out, at step 210. The timeout takes place after a passage of time sufficient to completely unlatching of the heads 4. If time is not out, the decelerating current is reduced by X mA, at step 212, and step 208 is repeated. If time is out, the microcontroller 40 starts a track search at step 220 without changing the mode to a closed loop at steps 214–218. By this method of head unlatch control, the heads 4 parked over the parking zones 5 move to the data areas of the disks 2. In the above steps 204–220, head unlatch is controlled in an open loop.

On the other hand, if the mode transition condition is satisfied before the timeout at step 208, the head unlatch shifts to closed loop control at steps 214, 216, 218 and 220. At step 214, the microcontroller 40 calculates a current speed $X_{vel}$ of the heads 4, using a gray code included in servo information received from the A/D converter 36, or the gray code and PES. The gray code represents information on each track, and indicates a current position of the heads 4. The current speed $X_{vel}$ of the heads 4 is obtained by, for example, by computing the following (previous gray code value—a current gray code value)/a servo sampling period. At step 216, the microcontroller 40 applies a decelerating current $I_{value}$ corresponding to the current speed $X_{vel}$ of the heads 4 to the VCM driver 44 via the D/A converter 42. Here, $I_{value}=A \times X_{vel}$, and A is a gain value. At step 218, the current speed $X_{vel}$ is compared with a predetermined speed value $V_{\_tol}$ to determine whether the current speed $X_{vel}$ is large enough to start a search mode. If the current speed $X_{vel}$ is the predetermined speed value $V_{tol}$ or larger, the procedure goes back to step 214 to continue head unlatch in the closed loop. If the current speed $X_{vel}$ is smaller than the predetermined speed value $V_{tol}$ by virtue of head unlatch control in the closed loop mode, the microcontroller 40 starts a track search, at step 220.

As described above, the head unlatch controlling method of the present invention can be implemented compatibly with variations of part performances and frequent design modifications, thereby reducing failure rate in the manufacturing process. Furthermore, since concurrent use of different-performance parts does not accompany additional management of a ROM, the manufacturing process can be easily managed.

Although the present invention has been described with reference to the specific embodiment, it is a mere exemplary application. Thus, it is clearly understood that many variations can be made by anyone skilled in the art within the scope and spirit of the present invention.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A head unlatch controlling method in a hard disk drive employing a magnetic latching mechanism, said method comprising the steps of:
    (a) performing a head unlatch operation in an open loop mode, using a predetermined current profile;
    (b) determining whether servo information is accurately detected during said step (a); and
    (c) changing the head unlatch operation from the open loop mode to a closed loop mode when the servo information is accurately detected.

2. A head unlatch controlling method in ahard disk drive as claimed in claim 1, wherein said step (c) comprises the substeps of:
    calculating a current speed of a head of said hard disk drive by using track information included in the servo information; and
    applying a decelerating current, corresponding to the current speed of the head, to a servo driver for controlling the head.

3. A head unlatch controlling method in a hard disk drive as claimed in claim 2, wherein said step (c) further comprises the substeps of:
    comparing the current speed of the head of said hard disk drive with a predetermined speed value; and
    when the current speed of the head of said hard disk drive is smaller than the predetermined speed value, starting a track search of the disk of the hard disk drive.

4. A head unlatch controlling method in a hard disk drive as claimed in claim 3, wherein said step (c) further comprises the substep of:
    when the current speed of the disk of the hard disk drive is not smaller than the predetermined speed value, returning to the step of calculating the current speed of the head of said hard disk drive.

5. A head unlatch controlling method in a hard disk drive as claimed in claim 1, wherein said step (c) further comprises the step of continuing the head unlatch operation in the open loop mode when the servo information is not accurately detected in step (b).

6. An arrangement for controlling a head unlatch operation in a hard disk drive which includes a head and a latching mechanism for latching the head, said arrangement comprising:
    means for performing the head unlatch operation in an open loop mode using a predetermined current profile;
    means for determining whether servo information is accurately detected during the performance of the head unlatch operation; and
    means for changing the head unlatch operation from the open loop mode to a closed loop mode when the servo information is accurately detected.

7. The arrangement as claimed in claim 6, wherein said means for changing the head unlatch operation from the open loop mode to the closed loop mode calculates a current speed of the head of said hard disk drive by using track information included in the servo information, and applies a decelerating current, corresponding to the current speed of the head, to control the head.

8. The arrangement as claimed in claim 7, further comprising a servo driver to which the decelerating current is applied for controlling the head of the head of the hard disk drive.

9. The arrangement as claimed in claim 6, further comprising means for maintaining the head unlatch operation in the open loop mode when the servo information is not accurately detected.

10. The arrangement as claimed in claim 6, wherein said means for changing the head unlatch operation from the open loop mode to the closed loop mode compares a current speed of the disk of the hard disk drive to a predetermined speed value;
    said arrangement further comprising means for starting a track search when the current speed of the disk of the hard disk drive is smaller than the predetermined speed value.

11. An arrangement for controlling a hard disk drive, said arrangement comprising:
    motor means for driving heads of the hard disk drive at a current speed;
    feedback means for feeding back data indicating the current speed of the heads;
    controller means responsive to the data indicating the current speed of the heads of the hard disk drive for controlling the motor means to perform a head unlatch operation;
    wherein said controller means carries out the head unlatch operation in an open loop mode using a predetermined current profile, determines whether servo information is accurately detected during performance of the head unlatch operation, and changes the head unlatch operation from the open loop mode to the closed loop mode when the servo information is accurately detected.

12. The arrangement as claimed in claim 11, wherein said controller means continues the head unlatch operation in the open loop mode when the servo information is not detected.

13. The arrangement as claimed in claim 11, wherein said controller means calculates the current speed of the head of the hard disk drive by using track information included in the servo information, and applies a decelerating current, corresponding to the current speed of the head, to control the head of the hard disk drive.

14. The arrangement as claimed in claim 13, wherein said motor means comprises a servo driver responsive to application of said decelerating current by said controller means for controlling the head of the hard disk drive.

15. The arrangement as claimed in claim 11, wherein said controller means compares a current speed of the head of the hard disk drive to a predetermined speed value, and wherein said controller means starts a track search of the hard disk drive when the current speed of the head of the hard disk drive is smaller than the predetermined speed value.

* * * * *